United States Patent [19]

Korner et al.

[11] 3,882,262
[45] May 6, 1975

[54] MODULAR ELECTRICAL PENETRATION

[75] Inventors: Renzo L. Korner, Horseheads; David Green, Corning; Albert Bereza, Elmira; Robert J. Colegrove, Horseheads, all of N.Y.

[73] Assignee: Westinghouse Electric Corporation, Pittsburgh, Pa.

[22] Filed: Jan. 10, 1974

[21] Appl. No.: 432,375

[52] U.S. Cl. .............................. 174/11 R; 174/151
[51] Int. Cl. .................. G21c 13/02; H01b 17/26
[58] Field of Search ........ 174/11 R, 18, 22 R, 23 R, 174/70 S, 151, 152 R; 339/218 R, 218 M

[56] References Cited
UNITED STATES PATENTS

| | | | |
|---|---|---|---|
| 3,520,989 | 7/1970 | Funk et al. | 174/151 |
| 3,746,375 | 7/1973 | Funk | 174/151 UX |
| 3,780,204 | 12/1973 | Oliver et al. | 174/11 R |
| 3,781,453 | 12/1973 | Funk et al. | 174/11 R |
| 3,801,722 | 4/1974 | Korner | 174/11 R |

Primary Examiner—Laramie E. Askin
Attorney, Agent, or Firm—W. G. Sutcliff

[57] ABSTRACT

A modular electrical penetration assembly designed for bringing electrical conductors through the containment vessel of a nuclear power plant. The modular assembly is factory assembled, with or without a leak detector monitoring space, and is adapted for ready field installation. A generally tubular enclosure defining metal member has at least one electrical conductor longitudinally extending therethrough, with a pair of axially aligned seal shroud means disposed within the enclosure about the electrical conductors. The shroud means is closely spaced from the tubular metal member and sealingly connected thereto at one end. A radiation resistant, chemically stable, gas impervious resinous potting material substantially fills the enclosure and upon thermal setting in place provides a compression seal along the conductor and at the seal shroud means.

8 Claims, 4 Drawing Figures

3,882,262

MODULAR ELECTRICAL PENETRATION

BACKGROUND OF THE INVENTION

The present invention relates to electrical penetrations which are utilized to sealingly bring electrical conductors through a nuclear containment vessel. The penetration is designed to withstand a possible reactor accident and to contain any radioactive contaminated gas within the containment vessel. The penetration must also withstand a predetermined pressure surge and residual pressure which might result from a reactor accident and a predetermined temperature rise above the ambient.

The containment vessel for the typical nuclear power plant comprises a metal dome which has reinforcing concrete on the exterior. Prior art penetration assemblies are field welded through the metallic reactor containment vessel. A tubular nozzle is typically provided through the containment vessel wall and the penetration assembly is field welded to the nozzle. This can make for a cumbersome field weld during the construction stages of the facility and creates quality control and reliability problems. The electrical penetration itself can be a relatively heavy bulky assembly, with a diameter of for example from 2 to 14 inches, carrying a multiplicity of relatively thick electrical conductors. Typically, a densely packed ceramic material has been provided between the actual conductor and the penetration assembly wall which is welded to the nozzle. A variety of sealing techniques such as ceramic to metal seals and sealing techniques, and other brazing techniques have been used to effect a seal for the penetration assembly to prevent gas flow from the containment vessel to the atmosphere. Normally a positive inert gas pressure is maintained within the containment area.

The use of thermal setting epoxy resins as a sealant between electrical conductors and metallic supporting surfaces is well known in sealing bushing terminals for electrical transformers. The desirability of providing a compression seal made by means of the shrinkage of the epoxy resin upon an annular metal shroud for oil transformers is also well known.

It is quite desirable to provide a leak detecting monitoring space within the electrical penetration assembly, which monitoring space can be connected to a monitoring gage and system in order to check the integrity of the seal. The nuclear reactor environment and particularly the hypothetical accident conditions for such a facility creates a demand for a highly reliable structure and materials combination for providing seal integrity.

In the process of assembling a nuclear power power station, it is desirable to be able to test a variety of subsystems as the construction process proceeds. It is therefore important to be able to seal off the containment vessel prior to final completion of all the electrical penetrations which may be finally desired for the system. It has been the practice to put temporary sealing flanges on the nozzles which are not finally assembled with electrical penetrations. It is also possible that due to design changes and equipment improvements during the construction of the facility, that the nature of the electrical penetration assembly which is desired may be changed or altered. With present systems where field welding is the effective sealing technique, there is very little flexibility to make such changes.

SUMMARY OF THE INVENTION

An improved electrical penetration assembly is provided which is readily adapted for modular assembly and construction techniques. The electrical penetration assembly is designed to be factory assembled, and is therefore more readily subject to quality control and testing procedures which greatly simplifies field assembly. The electrical penetration comprises an enclosure defining metal member which is adapted to be sealingly connected to the nozzle extending through the containment vessel by means of a flange with a predetermined numbered of apertures into which the penetration assembly is fitted. Circumferential sealing means are disposed about the exterior surface of the enclosure defining metal member. A pair of axially aligned annular seal shroud means are disposed within the enclosure defined by the metal member. The seal shroud means have one end sealingly connected to the interior surface of the enclosure defining metal member, with the other free end of the shroud means being spaced from the enclosure defining metal member, and with an outer surface generally parallel to the interior surface of the metal member. At least one, and preferably a plurality of longitudinally extending electrical conductors are brought through the enclosure defined by the metal member, with the conductors passing through the shroud means, and extending parallel with the longitudinal axis of the aligned annular shroud means. A radiation resistant, chemically stable, gas impervious, compressive setting, resinous potting material substantially fills the enclosure defined by the metal members, to thereby provide a compression seal about and along the length of the conductors, as well as a compression seal at the seal shroud means.

In the preferred embodiments of the invention a leak detecting monitoring space is provided in a central portion of the enclosure and an aperture is provided through the enclosure metal member in communication with the monitoring space to permit connection of the monitoring space to a leak detecting system.

BRIEF DESCIPTION OF THE DRAWING

Figure 1:
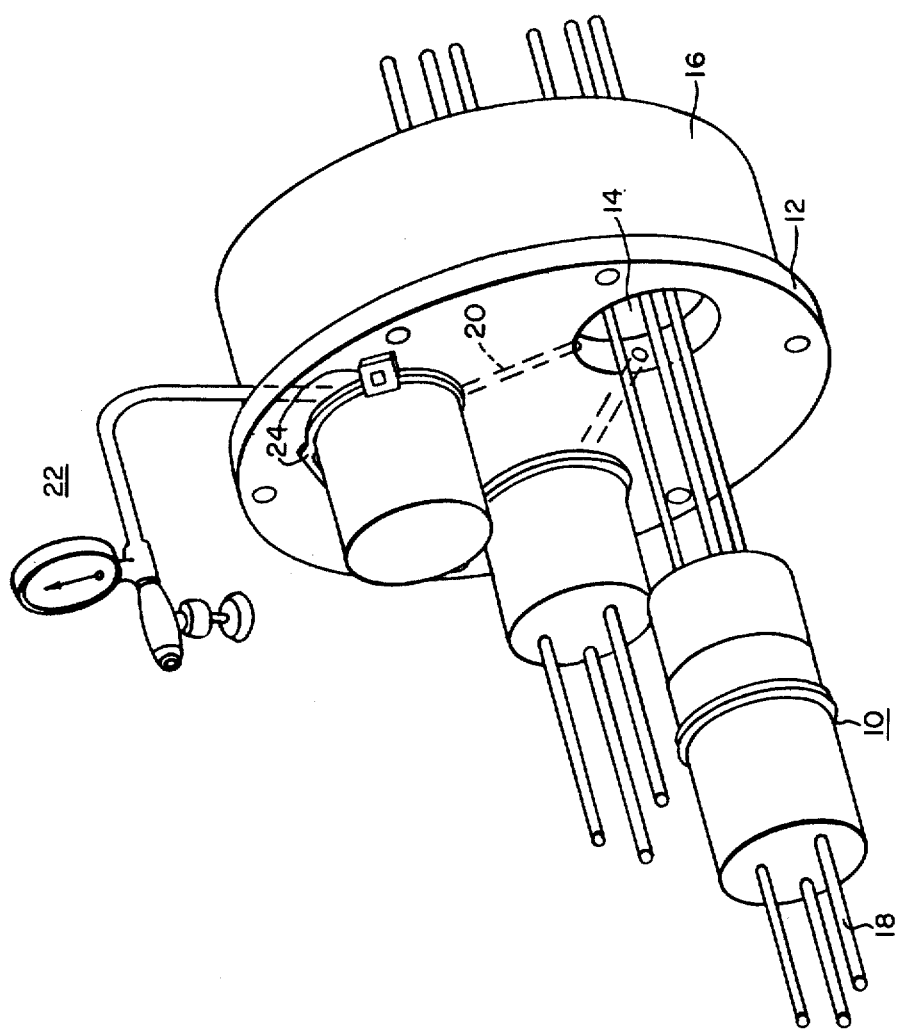
FIG. 1 is a perspective view of a modular electrical penetration assembly of the present invention adapted to a sealing flange, with one of the modules partially removed from the aperture and flange to which it fits.
Figure 2:
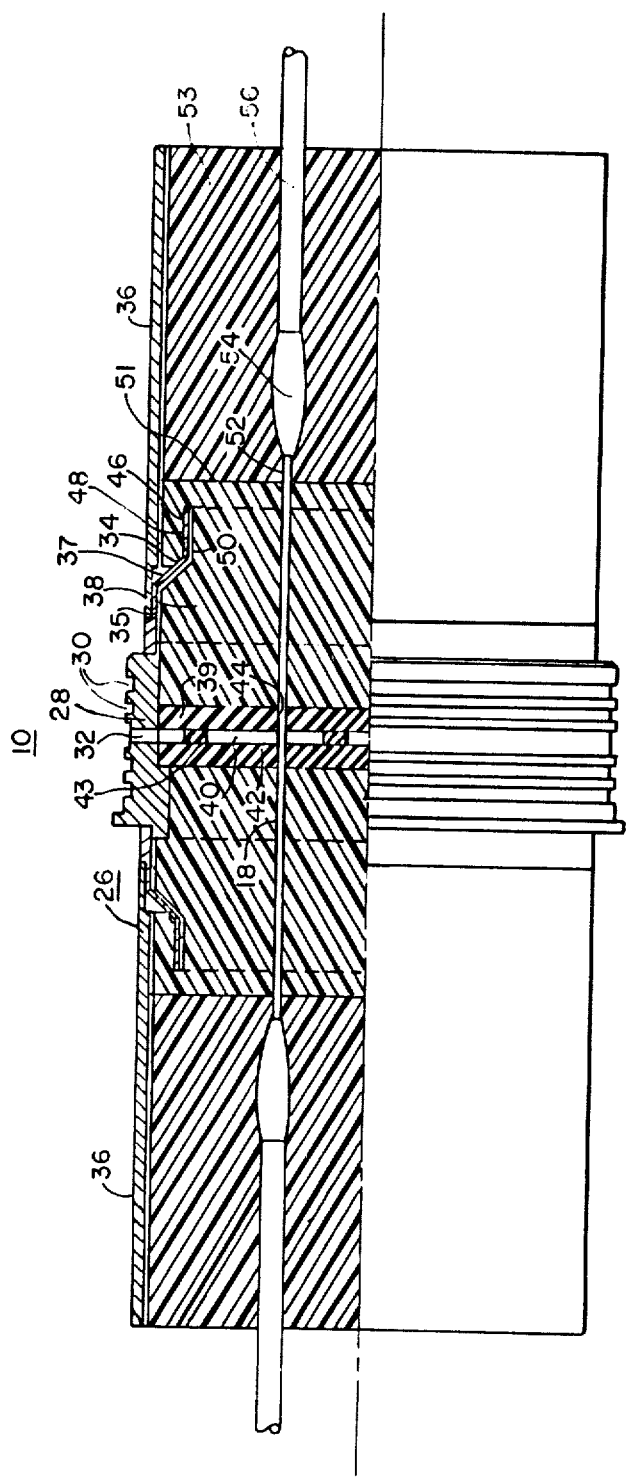
FIG. 2 is a side elevational view, partly in section, of a preferred embodiment of the electrical penetration assembly of the present invention.

The invention can be best understood by reference to the exemplary embodiments in the drawings. In FIG. 1 three such electrical penetration assemblies 10 are seen with two of the assemblies 10 being mounted in place in a sealing flange 12 provided with penetration assembly receiving apertures 14, and which sealing flange 12 is mounted and sealed to containment nozzle 16. A plurality of electrical conductors 18 are seen extending from the ends of the penetration assemblies 10. Manifold passageways 20 are seen extending between the penetration assembly receiving apertures 14 within flange 12, which manifold passageways 20 are connectable to the leak detecting monitoring system 22. Hold down clamps 24 are utilized to mount the penetration assemblies within the apertures 14 with an O-ring seal therebetween. The modular electrical penetration assembly 10 is seen in greater detail in FIG. 2 wherein an enclosure defining metal member 26 comprises a plurality of interconnected elements, including a centralized annular header member 28 having a plurality of circumferential O-ring grooves 30 or sealing means disposed about the exterior surface thereof to permit sealing engagement of the header to the sealing flange 12. An aperture 32 is provided through the header 28 as will be explained later to permit connection to the leak monitoring space. The header diameter can range anywhere from less than one inch to many inches in diameter with a typical diameter being about five inches. A pair of axially aligned annular seal shroud means 34 are provided and sealingly connected, such as by a weld, to either end of the header 28. The seal shroud means 34 is generally annular, and in this embodiment comprises an enlarged diameter cylindrical end portion 35 sealingly connected to the header 28, a transition shoulder portion 37, and a reduced diameter cylindrical portion 46. Tubular metal shroud extensions 36 are sealingly connected to the exterior of the end portion 35 of shroud means 34, such as by welding. The header 28, shroud means 34, and the shroud extensions 36 are axially aligned along a central longitudinal axis. The electrical conductor 18 passes longitudinally through the penetration assembly 10. A radiation resistant, chemically stable, gas imprevious, compressive setting, resinous potting material 38 substantially fills the enclosure defined by the metal enclosure members. A pair of spaced insulator disks 42 are provided proximate the aperture 32 through the header, and are disposed to provide a leak monitoring chamber 40 to which the aperture 32 is connected. The resinous potting material provides a compression seal about and along the length of the conductor, and also upon the shroud means. Aligned apertures 44 are provided through the insulator disks 42, for receiving and passing the electrical conductors therethrough. The insulator disks are force fitted into place, and insulating spacers 43 may be positioned therebetween during the fabrication process to maintain the spacing therebetween for defining the chamber 40. The header 28, shroud means 34, and shroud extension 36 are all typically stainless steel welded together to form the enclosure defining member 26. The insulator disks 42 are typically a paper filled phenolic resin such as "MICARTA" which is a trademark of the Westinghouse Electric Company.

In fabricating the penetration assembly, the insulating disks 42 are force fitted into place against the interior surface of the header 28 providing the leak detecting chamber 40. The compressive setting resinous potting material can then be poured into first one end, and then the other end of the shroud extensions to seal the assembly. The process will only be described with respect to one end of the penetration assembly, with the other end being identically sealed. The compressive setting, resinous potting material is typically prepared from an epoxy resin such as EPON 815 available from the Shell Chemical Company, and a curing or hardening agent such as EPON Agent Z, also available from the Shell Chemical Company. A granular filler is included, such as "Tec-o-Sil" available from the Tennessee Electro Minerals Corporation, which filler is a finely granulated quartz material. A typical batch of this resinous potting material comprises 100 parts resin, 280 parts filler, and 20 parts hardening or curing agent. The resinous potting material 38 is poured in place, and gels at about 60°C in about 3 hours. Additional post curing heating at temperatures from 100° to 150°C can further improve the sealing characteristeric of the material. The resinous potting material 38 forms a very effective seal along the entire length of the conductor 18 to prevent any leakage along the conductor. The conductor 18 may be sandblasted, or roughened by other such conventional techniques, to insure intimate contacting of the conductor by the resinous sealing material. The compressive setting resinous sealing material shrinks upon hardening and forms a very good compressive seal. The resinous potting material has a coefficient of expansion which is greater than that of the metal enclosure member.

The seal shroud means structure 34 provides a very effective structural surface upon which a compressive seal may also be formed by the resinous sealing material. The reduced diameter cylindrical extending end 46 of the shroud means 34 is closely spaced from the interior wall of the shroud extension 36 and is generally parallel to the interior surface of the member 36. The resinous material 38 upon shrinking will shrink away from the mold wall formed by the shroud extension 36, and will compressively seal on the spaced exterior surface 48, of the shroud end 46. A mold release agent may be provided upon the interior wall of the shroud extension 36, and also upon the interior surface 50 of the shroud end 46, to permit ready shrinkage of the resinous material. The compressive seal of the resinous potting material upon the outer surface 48 of the shroud means 34 provides an effective seal to prevent leakage along the interior wall of the shroud extension. The resinous potting material is poured to the line 51 which permits an extending end 52 of the conductor 18 to be exposed beyond the end surface of the hardened material. The conductor end 52 is connected by a splice 54 to a service conductor 56 which extends from the end of the penetration assembly. Additional thermal setting epoxy resin insulating material 53 is thereafter poured into the remainder of the volume defined by the shroud extensions to form an insulated packing about the service conductor 56. The same resinous material as already described for potting material 38 could be utilized for insulating potting material 53, but typically a less expensive material can be utilized since the effective seal has already been made using potting 38. The resinous material 53 merely acts as an insulating spacing and conductor support material, which need not evidence the same compressive sealing characteristics as potting material 38.

A wide variety of epoxy resins have been used for the resinous potting material 38 and generally are characterized as Bis phenol-A type resins, such as the Epon 815 already specified, as well as ERL 2795 epoxy resin available from the Union Carbide Company and ARALDITE 506 available from Ciba Products Company. The curing agents are typically low liquid or low melting blends of methylene-di-aniline and meta phenyline diamine. The filler material typically comprises finally granulated insulating material such as silica, with a mean particle size of about 7 microns. Other insulated fillers which are chemically non-reactive and radiation resistant can also be utilized.

Figure 3:
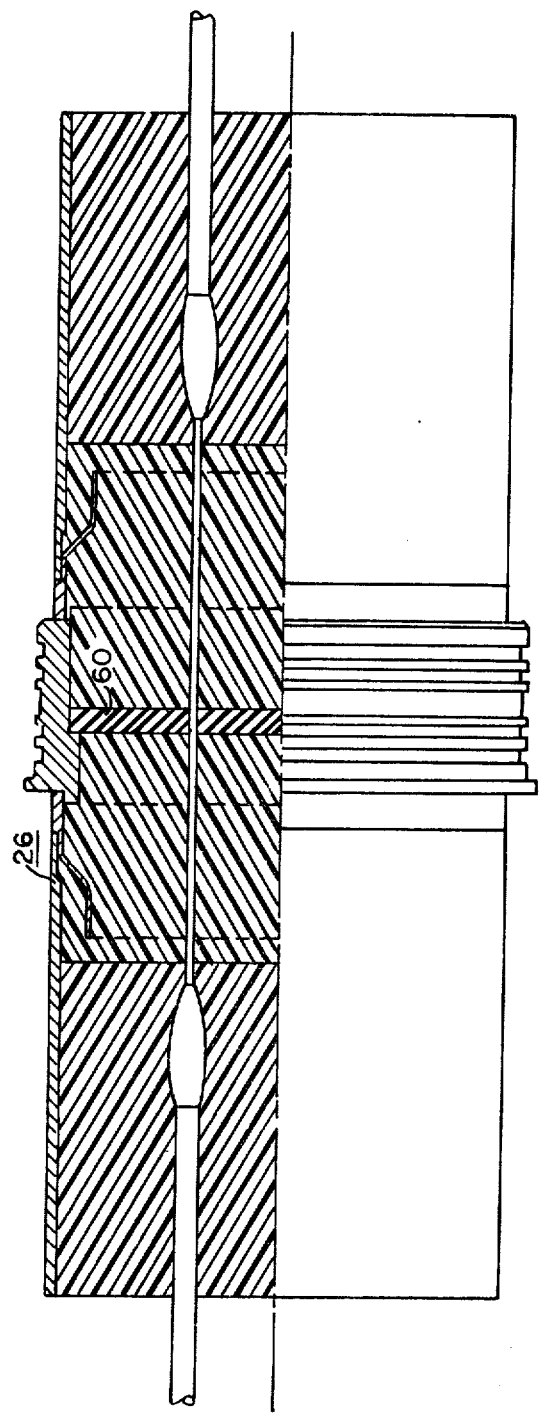
FIG. 3 is an alternative embodiment in elevational view, partly in section, of such an electrical penetration assembly without a leak detecting monitoring space.

In the embodiment seen in FIG. 3 the basic penetration assembly structure 10 is essentially the same except the leak detecting chamber 40 has been eliminated and a single insulator disk 60 is disposed and fitted within and against the interior wall of the header to facilitate forming of the resinous seals.

Figure 4:
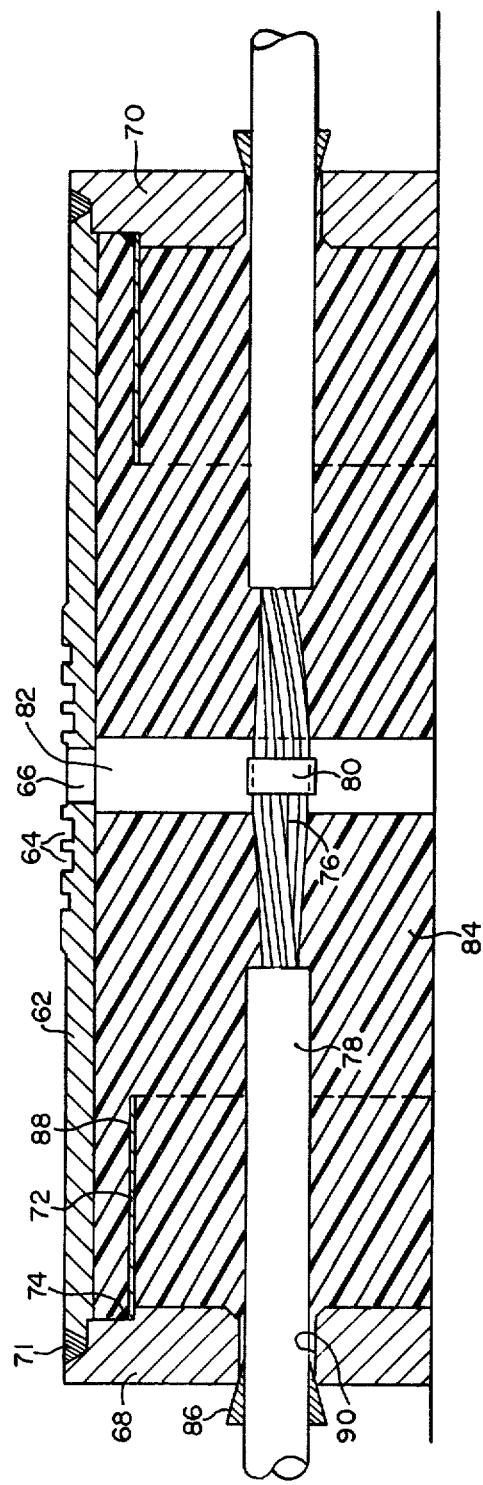
FIG. 4 is an elevational view partly in section of an alternative embodiment of an electrical penetration assembly.

In an alternative embodiment seen in FIG. 4 a unitary tubular enclosure member 62 is provided with circumferentially disposed O-ring grooves 64 on the central exterior surface of the tubular member 60. An aperture 66 is directed through the wall for the detection purposes. Silicone rubber O-rings fit within the grooves to permit redundant seals to be made. End bulkhead members 68, 70 are provided at either end of the assembly and are sealingly fitted in place and circumferentially welded to tubular member 62 at welds 71. A pair of annular shroud members 72, extend inwardly one from each of the bulkheads 68, 70 and are sealingly welded thereto at welds 74. In this embodiment a plurality of individual conductors 76 are provided within conductor sheath 78. The conductors 76 are insulatingly spaced apart by means of an insulating spacer means 80 provided within the leak detecting chamber 82 maintained between end surfaces of the resinous potting material 84. The resinous potting material 84 is again the epoxy resin 38 already described with respect to the embodiment of FIG. 2. In fabricating the embodiment of FIG. 4, the resinous potting material is poured through the aperture 66 and leak chamber 82 to first fill one end of the assembly, and after setting, to fill the other end. Temporary sealing plugs 86 may be provided about the conductor sheath 78 as it passes through apertures 90 in bulkheads 68, 70. The resinous potting material 84 forms a seal in aperture 90 as its sets. The compression seals in this embodiment are formed first about each individual conductor 76, and also on the outer surface 88 of the annular seal shroud means 72 as the potting material 84 cures and sets.

The embodiment of FIG. 4 can be utilized as seen in FIG. 1 with a flange mounting, or can be welded to a sealing ring of carbon steel, not shown, about the circumference of the tubular body 62, which sealing ring can be field welded to one end of the penetration nozzle provided through the containment wall. The penetration nozzle is typically carbon steel.

What is claimed:

1. An electrical penetration assembly comprising:
   a. an enclosure defining metal member;
   b. a pair of axially aligned annular seal shroud means disposed within the enclosure defined by the metal member, each of said annular seal shroud means comprising a sealing end which is sealingly connected to the interior surface of the metal member, and a free end which is spaced from the enclosure defining metal member which free end has an outer surface generally parallel to the interior surface of the metal member;
   c. at least one longitudinally extending electrical conductor extending through said enclosure defined by said metal member, and passing through both of the annular seal shroud means;
   d. a chemically stable, radioactive resistant, gas impervious, compressive setting, resinous potting material substantially filling the enclosure defined by said metal member, and providing a compression seal along and about the conductor, and about the outer surface of the free end of each of the seal shroud means.

2. The electrical assembly penetration specified in claim 1, wherein the enclosure defining metal member is generally tubular.

3. The electrical penetration assembly specified in claim 2, wherein circumferential sealing means are disposed about the exterior surface of said tubular metal member, which sealing means are adapted to seal the assembly against a penetration assembly receiving structure.

4. The electrical penetration assembly specified in claim 2, wherein the resinous potting material has a coefficient of expansion greater than that of the tubular metal member, and which resinous potting material shrinks upon curing thereby creating said compression seal.

5. The electrical penetration assembly specified in claim 2, wherein a centrally located monitoring chamber is defined within the penetration assembly by spacing the potting material, and providing an aperture through said tubular metal member interconnected with said monitoring chamber.

6. The electrical penetration assembly specified in claim 5, wherein a pair of insulator disks are centrally located within the volume defined by the tubular metal member, which insulator disks are spaced apart in generally parallel relationship to define the monitoring chamber therebetween, said insulator disks having conductor passing apertures therethrough.

7. The electrical penetration assembly specified in claim 1, wherein the metal member enclosure comprises a centrally located annular sealing header and tubular extensions sealed to each side of the sealing header, circumferential sealing means provided in the exterior surface of the sealing header, with each annular seal shroud means having an outwardly directed extension at one end which is sealably connected to the sealing header.

8. The electrical penetration assembly specified in claim 1, wherein the metal member enclosure comprises a generally tubular member with an inboard and outboard bulkhead member sealed to each end of the tubular member, circumferential sealing means provided in the exterior surface of the central portion of the tubular member, with each annular seal shroud means sealingly connected to the interior surface of the respective inboard and outboard bulkhead members and extending toward the central portion of the tubular member, and at least one aligned aperture provided in each of the inboard and outboard bulkhead members for passing an electrical conductor therethrough.

* * * * *